April 1, 1969 J. W. SLEMMONS 3,435,543

NUMERICAL STORAGE AND COMPUTING DEVICE

Filed Oct. 10, 1966 Sheet 1 of 3

INVENTOR.
JOHN W. SLEMMONS

BY Robert G. Rogers

ATTORNEY

INVENTOR.
JOHN W. SLEMMONS
BY Robert G. Rogers
ATTORNEY

INVENTOR.
JOHN W. SLEMMONS
BY Robert G. Rogers
ATTORNEY

United States Patent Office 3,435,543

Patented Apr. 1, 1969

3,435,543

NUMERICAL STORAGE AND COMPUTING DEVICE

John Whittier Slemmons, 19142 Glen Albyn, Orange, Calif. 92667

Filed Oct. 10, 1966, Ser. No. 585,659
Int. Cl. B43l 1/00, 1/12; G09b 1/16
U.S. Cl. 35—61 3 Claims

ABSTRACT OF THE DISCLOSURE

The device consists of a cover having printed indicia thereon in alignment with various apertures in the cover. A base member having an adhesive layer thereon is disposed below the cover. Either the base member or the adhesive layer is colored. A translucent sheet is positioned between the base member and the cover. When the translucent sheet is selectively pressed against the adhesive layer colored displays becomes visible. An erase means is composed of several integral means for individually disengaging portions of said translucent layer from the adhesive layer to selectively erase some or all colored displays. Glass beads may protrude from the surface of the adhesive layer.

This invention relates to a device used in computing and storing the results of a computation and, more particularly, to such a device wherein the results of a computation may be stored and the calculation numerals erased by a sliding member.

Everyday problems such as maintaining a record of miles traveled, gasoline consumed, bank balance, etc., create a need for a relatively simple and inexpensive numerical system. In as much as the computations and numerals used therein are constantly changing, the system must include means for erasing at least a portion of the calculations after each computation. Thereafter, when new data presents itself, a user is able to quickly make additional computations. However, since in many instances, the previous results are necessary to initiate subsequent data processing, those results must be stored until new results have been formulated.

In addition, the system should be simple in operation and easily carried when not in use. In the usual situation, a user would require easy access to the device, such as when traveling in a vehicle or when making a bank deposit. It should, therefore, be easily accessible, require little skill to operate, and should not require extensive preparation preliminary to its use.

Also, a device of this sort should be rugged in design and relatively inexpensive so as to make its use economically feasible.

The present art devices comprise scraps of paper, notebooks and the like, which are used with pen and pencil. After several uses, the pads have a tendency to become cluttered as do the scraps of paper. Also, scraps of paper are cumbersome and are often misplaced. The frustration of finding previously stored data may cause a user to seek even additional pieces of paper which could create additional problems of storage, compliation and coordination of numerical data. As a result, errors, miscalculations and misunderstandings may arise.

As a result of the problems described above, everyday calculations and data may not be as efficiently processed as is possible. A user may psychologically shy away from computations because of the practical difficulties inherent in making the computations.

Therefore, a need exists for a low cost, compact, effective means for executing numerical calculations with the capability for independently storing and/or erasing the numerals used.

Briefly, the present invention overcomes many of the difficulties inherent in existing systems and methods and comprises a relatively rigid base layer over at least a portion of which an adhesible layer such as paraffin is disposed. The adhesive layer may be divided into more than one portion. Cover means, including means defining or circumscribing at least two portions of the adhesible layer, are disposed over the base layer. The circumscribing means may be window-like openings provided in the cover for exposing portions of the adhesive layer. The openings are adjacent to each other. Translucent means are provided to cover the adhesible layer where exposed by the cover means and to contact the layer when designations such as numerals are impressed on the translucent means by blunt instruments such as a pencil or shaped piece of wood having a point. A transparent sheet may be added to cover the translucent means although such a sheet is not necessary.

Impressions made on the translucent means cause it to adhere to the adhesible layer on the base layer during a computation or storage mode and form a display. As a result, the color of the adhesive material, or base layer, is visible to the viewer where the impressions are made.

In certain embodiments, the adhesive layer may be provided with relatively small embedded members such as glass beads to support the translucent means from the adhesive surface. When impressions are made on the translucent surface, the glass beads are deformed so that they do not interfere with designations made on the surface of the translucent means.

Since the beads hold the translucent means from the surface, a clearer writing surface is assured. In lieu of the glass beads, a relatively thin perforated plastic sheet may be placed over the adhesive layer between the translucent means and the adhesive surface to support the translucent means from the surface, except when making impressions thereon. The plastic sheet also assures a clearer writing surface.

Erase means are provided with a plurality of edges for individually disengaging selected portions of the translucent means from the adhesible layer during an erase mode. In other words, the erase means can erase either display without disturbing the other.

The device is thus provided with the capability for storing one result while calculating another. Since the openings are adjacent to each other, the stored result can easily be viewed while making additional calculations. In one embodiment, the erase means also smoothes the surface of the adhesible layer during such erasure if the material is also an impressionable material such as paraffin.

In one embodiment the erase means comprises a sheet having removed areas for forming openings which mate with the circumscribed areas of the adhesive means. Each opening is formed with an angled edge for facilitating sliding of the erase means.

In another embodiment, the erase means may comprise a member rotatably secured between the openings including edges which effectively mate with the openings. Upon rotation in one direction, one edge of the member causes a separation of one portion of the translucent means from the adhesive layer. If rotated in the other direction, the other edge causes a separation of the other portion of the translucent means.

Therefore, it is an object of this invention to provide a relatively simple, low cost and economic computations device used for computing and storing results of computations.

It is another object of this invention to provide storage means for storing computational results which are not disturbed during a subsequent computation and erase cycle.

A still further object of this invention is to provide a computational capability which may use a stored computation and result developed during a previous cycle.

Another object of the invention is to provide a computing device having easy access to previously computed results and easy access to a capability for processing additional numerical data.

A further object of the invention is to provide a process for executing computations, storing results and erasing results of computations so that the results can be used with subsequent computations and so that previously used computations do not interfere with subsequent computations.

These and other objects of this invention will become more apparent in connection with the following drawings of which, FIGURE 1 is a perspective view of a preferred embodiment of the device showing the erase modes.

Figures 1, 2:
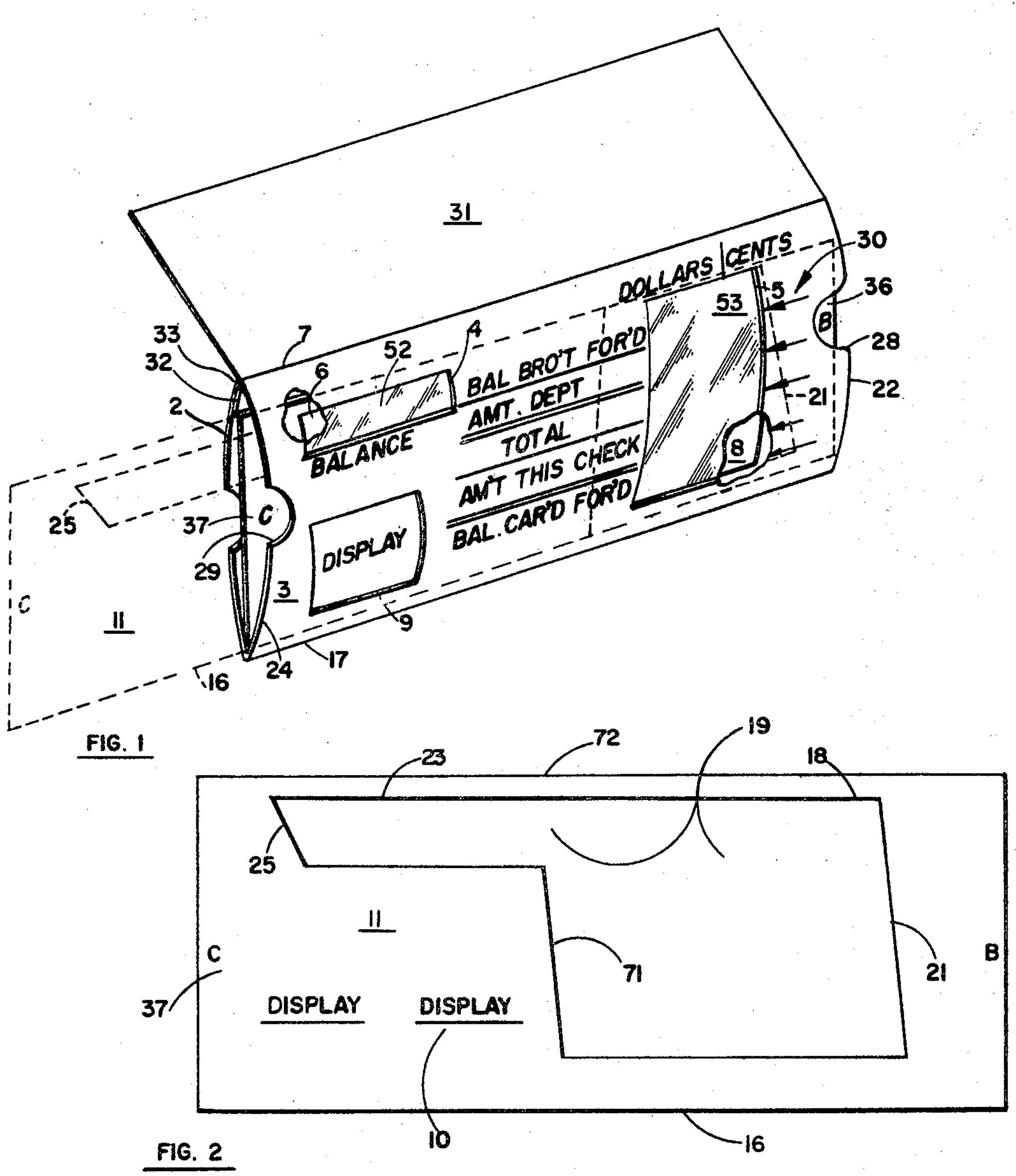
FIGURE 2 is a view of the erase means used in the FIGURE 1 embodiment.

Referring now to FIGURE 1 wherein is shown one embodiment of the computational device. For purposes of this description the device is described for use in connection with bank deposits, withdrawals and computations associated therewith, although it can be designed for other applications. For example, additional applications believed within the scope of the invention include its use as a sketch pad, automobile mileage comparator, device for storing directional and procurement information and similar uses.

The FIGURE 1 embodiment comprises back portion 2 and cover portion 3 joined at edge 7. The cover also includes adjacent window areas 4 and 5. The back and cover portions as well as the erase means 11 may be comprised of a medium card stock. In certain embodiments, the base portion may be more rigid than the cover and erase means although in a preferred embodiment, the various portions are comprised of the same material. For most practical applications, the base is provided with a color at least under the window areas. For example, it may be colored green, black, red or any combination of colors.

The windows are filled or covered with translucent means 52 and 53 such as a tinted plastic sheet or other similar translucent materials. For the embodiment illustrated, the means comprises two sheets which are secured to the underside of the cover by glue or some other adhesive. In the alternative, the sheets could be secured to the top surface of the cover. In a preferred embodiment, the translucent material may have a white or colored tint as required to enable a user to more easily see the base color during a processing cycle.

The back portion also includes relatively transparent deposits 6 and 8 (shown in the cut away area) such as paraffin or other materials which slightly adhere to the translucent sheets when the sheets are pressed against the material. In a preferred embodiment, the deposits may be disposed under the window areas of the cover although, in other embodiments, it may be disposed over the entire back cover.

The thickness of the paraffin when compared to the base layer, may be relatively thin. For example, it may have a thickness of only a few thousandths of an inch whereas the back portion may be several times that thick. It should be noted that the paraffin may be also colored. If the paraffin is colored, it may not be necessary to provide a color for the base layer, although both layers could be colored.

In operation, an impression is made on a translucent sheet which causes it to contact the paraffin underneath. The paraffin and the sheet adhere because of the consistency of the paraffin and pressure exerted on the sheet in making the impression. When the sheet and the paraffin adhere, the base color (or paraffin color) becomes visible at the areas of contact. When the erase means is operated the sheet and the paraffin become disengaged and the impression is erased.

In one embodiment, the device may have a length of approximately six inches and a height of approximately three inches. Other sizes and configurations may also be used. One window opening may be one and one-half inches square and the other window opening may be one and one-half inches in length and approximately one-half inch in height. Although two window openings having rectangular configurations are shown, it should be obvious that more or less windows in various configurations could be provided without departing from the scope of the invention.

Check registers ordinarily have an ink absorbing back cover and often additional sheets wherein computations are made. However, the space is usually not adequate to meet the demands of a user and confusion and miscalculation often result.

By means of the system described herein, computing space is inexhaustible and if the device is made to insert into a pocket area comprising part of the back portion of the register, instead of being an integral part of the register, as shown in FIGURE 1, it can be used, for example, until the adhesible layer or the translucent means wears out. If the space in the register is exhausted before the device, the device can be transferred to an additional register.

In fabricating the device the paraffin layer may be sprayed onto the base layer or deposited thereon by immersing the base layer into a solution of paraffin until a deposit of sufficient thickness to accommodate an intended use accrues. A screening process, as well as other processes known in the art, may be utilized to achieve suitable deposit of paraffin on the base portion.

In lieu of a paraffin material, other materials such as certain plastic gels or non-hardenable pressure sensitive adhesives known in the art, may be formed on the base if the characteristics of adhesibility and erasibility are provided.

Another window area 9 is shown in the cover but it is not directly related to the inventive aspects of the device. Window 9 in cooperation with erase means 11, may be used to display fixed information such as an advertisement. In one position of the erase means, one type of information may be displayed while in another position, different information may be displayed. Several such displays could be provided in a single embodiment although in certain embodiments the display could be eliminated.

In another embodiment, numeral scales could be incorporated into the erase means to form a simple slide rule. Specifically, the cover could be provided with a transparent opening within the range of the particular erase means. Fixed numerals could be imprinted on the transparent opening which could be mated with numerals imprinted on the erase means.

Erase means 11, shown more clearly in FIGURE 2, comprises a sheet of material for sliding laterally between the cover and back portions of the device. Edge 16 slides against the bottom edge 17 of the cover and back portions where the two join.

A portion of the slideable member is removed to form two-part opening 19, which approximately matches the outside dimensions of the window areas.

Opening 18, under window area 5, is formed so that the edge 21 of the opening nearest edge 22 is formed at an angle with respect to top edge 72 to permit easier entry of the edge 21 into the device after an erase mode. The angular edge minimizes engagement between the edge 22 and edge 21. Opening 23 nearest edge 24 of the device is also provided with an angular edge 25 for the same reason. Edge 71 is formed at an angle with respect to edge 72. Opening 18 has a width which is approximately the width of window openings 4 and 5.

It should be obvious that while sloping edges are shown, other angular edges designed to minimize engagement as described may also be used.

During the balance erase mode, the erase means is gripped by tab 36 labeled B for "Balance" and pulled laterally to the right. Edge 25 contacts the translucent means and slides against the paraffin. Where the translucent sheet is in adherence with the paraffin, edge 25 causes a disengagement of the sheet from the paraffin and consequently erases whatever information is illustrated in the window.

After an erase mode, shown by the right side of the dotted line in FIGURE 1, the erase means is then pushed laterally back into position. As indicated above, if edge 25 were parallel to edge 24, it would have a tendency to engage edge 24 of the device and be impaired from sliding easily back into position.

The lateral sliding motion rubs across the paraffin and tends to smooth out the depressions made on the surface of the paraffin when numerals are recorded in the sheet.

The calculation erase mode is entered into by gripping tab 37, labeled C for "Calculation" and pulling the erase means to the left as shown by the dotted line on the left side of FIGURE 1. During a calculation erase mode, the numerals stored in the balance section are not disturbed and vice versa.

Indentations 28 and 29 are provided in the cover and back portions to permit easier gripping of the tabs.

In the calculation erase mode the display shown in window 9 changes to the display labeled 10.

Arrows 30 are imprinted on cover 3 to aid the user in keeping the numbers aligned during calculation. In other embodiments, a grid or other line pattern could be imprinted thereon.

In one embodiment, insert 31 may be included with the device for insertion into, for example, a pocket provided with a check register. In such embodiments, the cover, back portion and insert 31 may be formed from a single sheet of material. In certain embodiments, the back cover may be an integral part of the check register, so that an insert would not be needed.

When the material is cut to size prior to forming the back cover and insert, an additional portion, length 32, is included. The material is folded into an envelope form which encloses erase means 11. The added portion provides a spacing equivalent to the thickness of the erase means. The spacing provided by the added length enables the erase means to slide more freely between the cover and the back. Edge 33 of added portion is joined to back 2 of the device.

In producing the device, the window openings and indentations may be stamped out with a press. After the stamping is completed, edges 17, 33 and other edges where a fold is to be made, may be scored so that they can be more easily folded into position.

Figure 3:
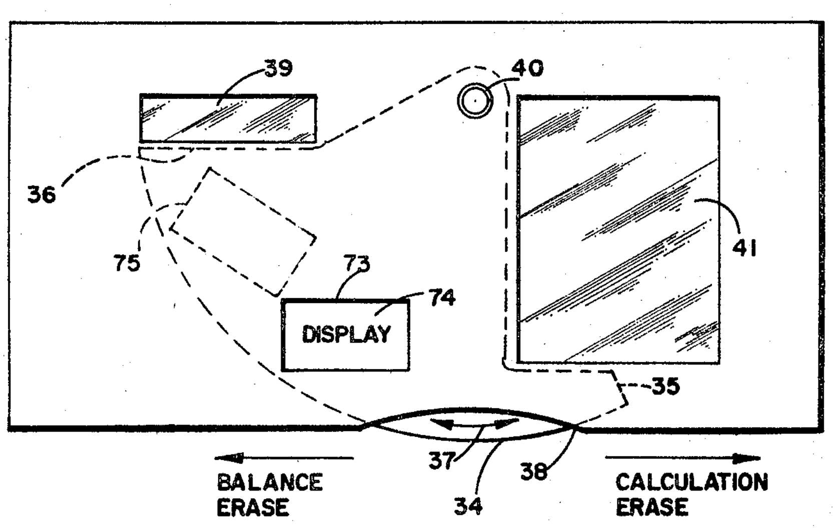
FIGURE 3 represents a rotatable embodiment of an erase means which can be substituted for the FIGURE 1 erase means.

In a further embodiment, an erase means is shown in FIGURE 3 as comprising rotatable member 34 having a protruding calculation erase edge 35 and a protruding balance erase edge 36. Portion 37 comprises the semicircular edge of the member between the erase edges, which is gripped for rotation. Indentation 38 is provided in the cover of the device to facilitate rotating the member.

Upon rotation to the left, erase edge 36 causes the translucent sheet 39 to be disengaged from the adhesive layer disposed on the base. Rotation towards the right causes edge 35 to separate translucent sheet 41 from the adhesive surface. The member is rotatably secured at point 40 by, for example, grommet or rivet.

Window 73 permits display 74 to be visible when member 34 is in a center position and display 75 to be visible when the member is rotated to the right.

Figure 4:
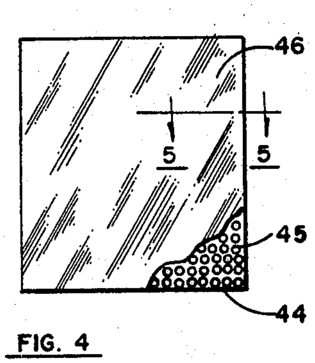
FIGURE 4 is a view of an embodiment of an adhesive layer including a perforated sheet disposed over the layer which may be used in the invention.
Figure 5:
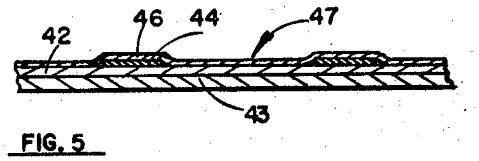
FIGURE 5 is a cross-sectional view of the FIGURE 4 embodiment.

Referring now to FIGURE 4, wherein is shown an embodiment of adhesive layer 42 comprising an adhesive material disposed on base layer 43 (see FIGURE 5). Thin plastic sheet 44 having a plurality of perforations 45 punched therein, is disposed on top of the adhesive layer. The perforations are incorporated into the sheet to permit a writing instrument to contact the adhesive when impressions are made on the translucent sheet 46 shown in FIGURE 5.

The plastic sheet supports translucent sheet 46 and keeps it from contacting the adhesive layer prior to writing and in close proximity to the initial contact region. As a result, high resolution of figures can be achieved. The written figures are comprised of multiple dot-like impressions because an indication results only when the plastic sheet is depressed in the perforations.

For example, as shown in FIGURE 5, the plastic sheet or film 44 is in direct contact with the adhesive layer. The opening 47 (for one perforation in sheet 44) permits the translucent sheet 46 to be pressed into contact with the adhesive and thereby show the color of the adhesive or the base material.

The cross-sectional view of FIGURE 5 is greatly enlarged to show the relationship between the perforations, the adhesive and the translucent sheet.

Figure 6:
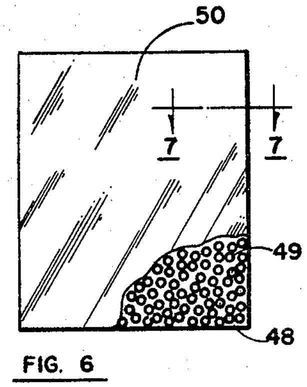
FIGURE 6 is a view of an embodiment of an adhesive layer including glass beads embedded in the surface of the layer which may be used in the invention.
Figure 7:
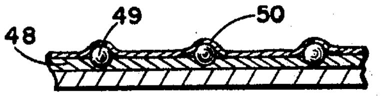
FIGURE 7 is a cross-sectional view of the FIGURE 6 embodiment.

Referring now to FIGURE 6, wherein is shown a different embodiment of adhesive layer 48 to which glass beads 49 have been partially embedded. The tops of the beads protrude slightly to support translucent means 50 and maintain a cleared surface prior to writing. When writing on the translucent means 50, as shown in the cross-sectional view of FIGURE 7, the beads are depressed into the adhesive surface and a continuous line results.

Figure 8:
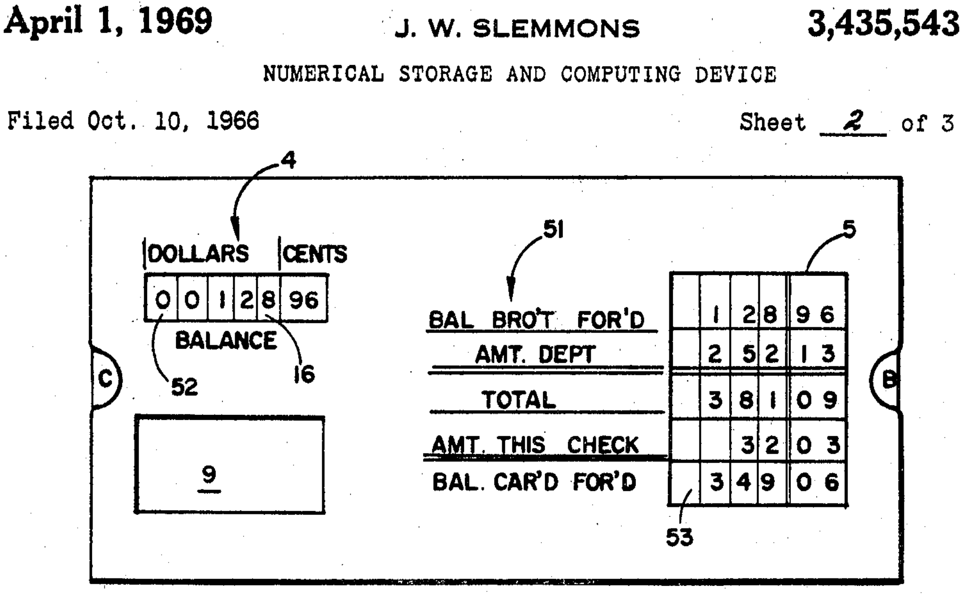
FIGURE 8 shows a front view of the device used as a calculator.

As shown in FIGURE 8, the cover includes instructional information printed or in some manner affixed to the surface thereof to provide directions to the user of the device. For example, data 51 appearing adjacent to opening 5 includes directions as to where dollars and cents are to be written onto translucent sheet 53. In addition, the information instructs a user where to enter the balance brought forward, the amount deposited, etc. The area adjacent opening 4 includes instructional information showing a user where to enter dollars and cents onto translucent sheet 52 and what the numerals signify.

For example, if a balance of $128.96 is brought forward and a check in the amount of $252.13 is deposited, a user may calculate his bank balance to be $381.09. If a user wrote a check for $32.03, by subtracting the check amount from the total balance, the balance to be carried forward of $349.06 may be easily calculated. The previous balance shown in window 4 as $128.96 may then be erased and a new balance of $349.06 entered.

The calculation shown in window 4 could be erased or left for review or re-checking prior to entering a subsequent calculation mode.

Although the invention has been described and illustrated in detail, it is to be understood that the same is by way of illustration and example only, and is not to be taken by way of limitation; the spirit and scope of this invention being limited only by the terms of the appended claims.

1. In combination, base means having a relatively thin adhesive layer disposed on at least selected areas of said base means with at least one of said base means or adhesive layer having a color, means for covering said base means, including means defining selected areas of said adhesive layer, said areas being adjacent to each other other in the longitudinal plane of said base means, translucent means comprising portions associated with said defined areas for forming displays of the color of said base means or adhesive layer when said translucent means is impressed against said adhesive layer, said color being visible through said translucent means where it is impressed against said adhesive layer, erase means having a plurality of integral means for individually disengaging portions of said translucent means from said adhesive layer to selectively erase said displays, said means including means for erasing one selected display without erasing another of said displays, said means for covering and said base means are jointed for forming evelope means with each end thereof being open, said covering means having at least two openings and said translucent means being secured to the surface of said covering means adjacent to said adhesive layer, said means for disengaging comprises a slideable member including removed portions which approximately match the dimensions of the openings in said covering means, said removed portions including first and second vertically directed edges which are disposed at angles with respect to the adjacent edges of the first openings in said covering means for disengaging the translucent means from said adhesible layer associated with said first opening and for facilitating sliding the member back into place after said translucent means is disengaged, and a third vertically directed edge disposed at an angle with respect to the adjacent edge of the second opening of said covering means for disengaging the translucent material from said adhesive layer associated with a second opening in said covering means, and spacing means interposed between said covering means and said base means having a thickness approximately equal to the thickness of said slideable member.

2. In combination, base means having a relatively thin adhesive layer disposed on at least selected areas of said base means with at least one of said base means or adhesive layer having a color, means for covering said base means, including means defining selected areas of said adhesive layer, said areas being adjacent to each other in the longitudinal plane of said base means, translucent means comprising portions associated with said defined areas for forming displays of the color of said base means or adhesive layer when said translucent means is impressed against said adhesive layer, said color being visible through said translucent means where it is impressed against said adhesive layer, erase means having a plurality of integral means for individually disengaging portions of said translucent means from said adhesive layer to selectively erase said displays, said means including means for erasing one selected display without erasing another of said displays, glass beads embedded in said adhesive layer, said beads having portions which protrude from the surface of said adhesive layer and support said translucent means from said surface, said adhesive layer having a thickness and a consistency for permitting said beads to be deformed into said adhesive layer when impressions are made on said translucent means whereby continuous displays are visible through said translucent means.

3. In combination, base means having a relatively thin adhesive layer disposed on at least selected areas of said base means with at least one of said base means or adhesive layer having a color, means for covering said base means, including means defining selected areas of said adhesive layer, said areas being adjacent to each other in the longitudinal plane of said base means, translucant means comprising portions associated with said defined areas for forming displays of the color of said base means or adhesive layer when said translucent means is impressed against said adhesive layer, said color being visible through said translucent means where it is impressed against said adhesive layer, erase means having a plurality of integral means for individually disengaging portions of said translucent means from said adhesive layer to selectively erase said displays, said means including means for erasing one selected display without erasing another of said displays, said erase means comprising rotatable means having one portion thereof secured for rotating with respect to said base and covering means, said rotatable means being circular in appearance with portions thereof removed to form first and second edges, said first edge being disposed adjacent to said translucent means associated with a first defined area and said second edge being disposed adjacent to said translucent means associated with a second defined area, said secured portion of the rotatable means comprising a portion of said circular area between the first and second edges, and a third curved edge between said first and second edges and opposite said secured portion whereby the rotation of said third edge clockwise causes said first edge to disengage the translucent means from the adhesive layer associated with said first defined area and whereby counterclockwise rotation of said third edge causes said second edge to disengage said translucent means from said adhesive layer associated with a second defined area, and said removed portions of said rotatable means permitting the disengagement of one translucent means without disturbing the engagement of the other translucent means.

References Cited

UNITED STATES PATENTS

| | | | |
|---|---|---|---|
| 1,568,548 | 1/1926 | Edelson | 35—66 |
| 1,677,087 | 7/1928 | Hexter | 35—13 |
| 1,677,569 | 7/1928 | Smith | 35—13 |
| 2,596,890 | 5/1952 | Dechert | 35—66 |

FOREIGN PATENTS

| | | |
|---|---|---|
| 616,318 | 10/1926 | France. |
| 164,571 | 12/1933 | Switzerland. |

JEROME SCHNALL, *Primary Examiner.*

HARLAND S. SKOGQUIST, *Assistant Examiner.*

U.S. Cl. X.R.

35—66, 75; 283—57